US008577918B2

(12) United States Patent
Collins et al.

(10) Patent No.: US 8,577,918 B2
(45) Date of Patent: Nov. 5, 2013

(54) METHOD AND SYSTEM FOR APPORTIONING OPPORTUNITY AMONG CAMPAIGNS IN A CRM SYSTEM

(75) Inventors: Jesse Collins, San Francisco, CA (US); Andrea P. Wildt, San Francisco, CA (US); Philippe Debaty, San Francisco, CA (US); Simon Y. Wong, San Carlos, CA (US); Bing Yang, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 565 days.

(21) Appl. No.: 12/584,955

(22) Filed: Sep. 14, 2009

(65) Prior Publication Data

US 2010/0070528 A1 Mar. 18, 2010

Related U.S. Application Data

(60) Provisional application No. 61/191,900, filed on Sep. 12, 2008.

(51) Int. Cl.
*G06F 17/30* (2006.01)
(52) U.S. Cl.
CPC .................. *G06F 17/30017* (2013.01)
USPC .................. 707/776; 707/796; 725/42
(58) Field of Classification Search
USPC .................. 707/713, 765, 768, 770, 776, 796; 705/7.29, 7.31, 7.35, 7.36, 7.11, 7.12, 705/7.25, 7.32, 7.33, 14.13, 14.14, 14.41, 705/26, 35, 400; 709/201, 203; 735/35, 36; 725/35, 36, 42
See application file for complete search history.

(56) References Cited

U.S. PATENT DOCUMENTS

| | | |
|---|---|---|
| 5,715,450 A | 2/1998 | Ambrose et al. |
| 5,821,937 A | 10/1998 | Tonelli et al. |
| 5,831,610 A | 11/1998 | Tonelli et al. |
| 5,873,096 A | 2/1999 | Lim et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |

(Continued)

OTHER PUBLICATIONS

Behrouz Minaei-Bidgoli et al., Business Service Modeling in Service-Oriented Enterprises, 2008, IEEE, 296-301.*

*Primary Examiner* — Jean B Fleurantin
(74) *Attorney, Agent, or Firm* — David Lewis; Marc Balban

(57) ABSTRACT

In accordance with embodiments, there are provided mechanisms and methods for providing apportioning of opportunity among campaigns in an on-demand service in a database system. These mechanisms and methods for providing apportioning of opportunity among campaigns can enable embodiments to automatically determine which campaigns are related to an opportunity and provide a filtered set of campaigns that are related to at least one opportunity. The ability of embodiments to apportion opportunity among campaigns can provide marketing information that accurately reflects the true relationship between an opportunity and a plurality of campaigns.

51 Claims, 23 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,549,908 B1 | 4/2003 | Loomans |
| 6,553,563 B2 | 4/2003 | Ambrose et al. |
| 6,574,635 B2 | 6/2003 | Stauber et al. |
| 6,577,726 B1 | 6/2003 | Huang et al. |
| 6,604,117 B2 | 8/2003 | Lim et al. |
| 6,604,128 B2 | 8/2003 | Diec |
| 6,609,150 B2 | 8/2003 | Lee et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,529,728 B2 | 5/2009 | Weissman et al. |
| 7,779,039 B2 | 8/2010 | Weissman et al. |
| 7,814,052 B2 | 10/2010 | Bezar et al. |
| 7,827,138 B2 | 11/2010 | Salmon et al. |
| 7,991,790 B2 * | 8/2011 | Barker et al. ............... 707/785 |
| 8,108,339 B2 | 1/2012 | Bezar et al. |
| 8,112,445 B2 | 2/2012 | Weissman et al. |
| 8,131,713 B2 | 3/2012 | Weissman et al. |
| 8,140,572 B1 * | 3/2012 | Ballard et al. ............ 707/776 |
| 8,150,833 B1 | 4/2012 | Scotton et al. |
| 8,161,010 B2 | 4/2012 | Weissman et al. |
| 8,204,855 B2 | 6/2012 | Salmon et al. |
| 8,239,420 B1 | 8/2012 | Wong |
| 8,255,548 B2 | 8/2012 | Hopkins et al. |
| 8,266,138 B1 | 9/2012 | Collins et al. |
| 8,280,875 B2 | 10/2012 | Weissman et al. |
| 8,335,781 B2 | 12/2012 | Weissman et al. |
| 8,359,647 B1 | 1/2013 | Casalaina et al. |
| 8,386,471 B2 | 2/2013 | Collins et al. |
| 8,402,045 B2 | 3/2013 | Scotton |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2007/0078950 A1 * | 4/2007 | Hopkins et al. ............... 709/217 |
| 2007/0124276 A1 | 5/2007 | Weissman et al. |
| 2008/0082555 A1 | 4/2008 | Salmon et al. |
| 2008/0086447 A1 | 4/2008 | Weissman et al. |
| 2008/0086514 A1 | 4/2008 | Weissman et al. |
| 2008/0126333 A1 | 5/2008 | Bezar et al. |
| 2008/0162544 A1 | 7/2008 | Weissman et al. |
| 2008/0275884 A1 | 11/2008 | Yoshida et al. |
| 2009/0024609 A1 * | 1/2009 | Barker et al. ................ 707/5 |
| 2009/0276395 A1 | 11/2009 | Weissman et al. |
| 2010/0070480 A1 | 3/2010 | Ahuja et al. |
| 2010/0070528 A1 | 3/2010 | Collins et al. |
| 2010/0088636 A1 | 4/2010 | Yerkes et al. |
| 2010/0100367 A1 | 4/2010 | Hopkins |
| 2010/0191719 A1 | 7/2010 | Weissman et al. |
| 2010/0205227 A1 | 8/2010 | Weissman et al. |
| 2010/0211619 A1 | 8/2010 | Weissman et al. |
| 2010/0217758 A1 | 8/2010 | Weissman et al. |
| 2010/0223254 A1 | 9/2010 | Weissman et al. |
| 2010/0223255 A1 | 9/2010 | Weissman et al. |
| 2010/0235837 A1 | 9/2010 | Weissman et al. |
| 2010/0274779 A1 | 10/2010 | Weissman et al. |
| 2010/0281014 A1 | 11/2010 | Weissman et al. |
| 2010/0281015 A1 | 11/2010 | Weissman et al. |
| 2010/0281016 A1 | 11/2010 | Weissman et al. |
| 2010/0332447 A1 | 12/2010 | Bezar et al. |
| 2011/0004668 A1 | 1/2011 | Salmon et al. |
| 2011/0082854 A1 | 4/2011 | Eidson et al. |
| 2011/0219338 A1 | 9/2011 | Schneider |
| 2011/0225232 A1 | 9/2011 | Casalaina et al. |
| 2011/0225233 A1 | 9/2011 | Casalaina et al. |
| 2011/0225495 A1 | 9/2011 | Casalaina et al. |
| 2011/0225500 A1 | 9/2011 | Casalaina et al. |
| 2011/0225506 A1 | 9/2011 | Casalaina et al. |
| 2011/0231831 A1 | 9/2011 | Smith et al. |
| 2011/0238706 A1 | 9/2011 | Wong et al. |
| 2011/0238707 A1 | 9/2011 | Wong et al. |
| 2011/0246449 A1 | 10/2011 | Collins et al. |
| 2011/0246527 A1 | 10/2011 | Bitting et al. |
| 2011/0282847 A1 | 11/2011 | Collins et al. |
| 2011/0282864 A1 | 11/2011 | Collins et al. |
| 2011/0282881 A1 | 11/2011 | Collins et al. |
| 2011/0289091 A1 | 11/2011 | Collins et al. |
| 2011/0295838 A1 | 12/2011 | Collins et al. |
| 2011/0295839 A1 | 12/2011 | Collins et al. |
| 2011/0302212 A1 | 12/2011 | Agrawal et al. |
| 2011/0320435 A1 | 12/2011 | Collins et al. |
| 2012/0023375 A1 | 1/2012 | Dutta et al. |
| 2012/0041986 A1 | 2/2012 | Weissman et al. |

(56) References Cited

U.S. PATENT DOCUMENTS

| | | |
|---|---|---|
| 2012/0110023 A1 | 5/2012 | Bezar et al. |
| 2012/0131068 A1 | 5/2012 | Scotton et al. |
| 2012/0151062 A1 | 6/2012 | Gusev et al. |
| 2012/0158833 A1 | 6/2012 | Hopkins |
| 2012/0158909 A1 | 6/2012 | Hopkins |
| 2012/0166871 A1 | 6/2012 | Weissman et al. |
| 2012/0233354 A1 | 9/2012 | Salmon et al. |
| 2012/0310989 A1 | 12/2012 | Weissman et al. |
| 2012/0311054 A1 | 12/2012 | Yoshida et al. |
| 2012/0330924 A1 | 12/2012 | Rajan et al. |
| 2012/0330926 A1 | 12/2012 | Rajan et al. |
| 2013/0001377 A1 | 1/2013 | Reiss |
| 2013/0007062 A1 | 1/2013 | Dutta et al. |
| 2013/0007523 A1 | 1/2013 | Unger et al. |
| 2013/0018890 A1 | 1/2013 | Rajan et al. |
| 2013/0042146 A1 | 2/2013 | Unger et al. |
| 2013/0046752 A1 | 2/2013 | Weissman et al. |
| 2013/0054648 A1 | 2/2013 | Mehta et al. |
| 2013/0060792 A1 | 3/2013 | Weissman et al. |

\* cited by examiner

| Lead_id | Contact_id |
|---|---|
| NULL | Contact1 |
| Lead1 | NULL |
| Lead2 | Contact2 |
| Lead3 | Contact3 |
| Lead4 | Contact3 |
| Lead5 | Contact3 |
| ... | ... |

*FIG. 8*

| Lead_id | Contact_id | First_Responded_Date | Primary |
|---|---|---|---|
| NULL | Contact1 | 5/1/2008 | True |
| Lead1 | NULL | 4/12/2008 | False |
| Lead2 | Contact2 | 4/12/2008 | True |
| Lead3 | Contact3 | 1/1/2008 | False |
| Lead4 | Contact3 | 3/1/2008 | True |
| Lead5 | Contact3 | 2/1/2008 | False |
| ... | ... | ... | ... |

| Name | organization_id. | campaign_influence_adj_id | campaign_id. | opportunity_id. | contact_id | Type | Primary | created_date. | created_by. | last_update. | last_update_by. | system_modstamp. | row_version. |

Opportunity
BigLife Inc.    Printable View   Customize Page   Help for this Page  (?)

Open Activities [0] | Activity History [0] | Contact Roles [2] | Partners [0] | Competitors [0] | Products [0]
Notes & Attachments [0] | Stage History [3]

1204   1206   1208   1210

| Opportunity Detail | [Edit] [Delete] [Clone] [Sharing] | | |
|---|---|---|---|
| Opportunity Owner | Andrea Wildt [Change] | Close Date | 09/30/2007 |
| Opportunity Name | BigLife Inc. | Stage | Value Proposition |
| Account Name | Canon | Probability (%) | 50% |
| Campaign Source | Website Promotion – Free Trial | Amount | $35,000.00 |
| Type | | | |

1202

▽ Additional Information

Lead Source     Organic
Next Step
Description

▽ System Information  Created By Andrea Wildt 9/16/2007 1:20PM  Last Modified By Andrea Wildt 9/24/2007 3:08PM

[Edit] [Delete] [Clone] [Sharing]

1216   1212   1218   1214   1226

| Campaign Influence | | [Add Campaign] | | Campaign Influence Help (?) | |
|---|---|---|---|---|---|
| Action | Campaign Name | Contact Name | Role | Primary Campaign | First Associated Date |
| Edit \| Del | Tradeshow – SW – Booth | Adrina Park | | | 9/20/2007 |
| Edit \| Del | Website Promotion – Free Trial | Lenora Fye | Other | ✓ | 9/11/2007 |

1220   1222   1224   1228

1230

| Contact Roles | [New] | | | | Contact Roles Help (?) | |
|---|---|---|---|---|---|---|
| Action | Contact Name | Account Name | Email | Phone | Role | Primary |
| Edit \| Del | Lenora Fye | Canon | | | Other | |
| Edit \| Del | Andrina Park | Canon | | | | |

FIG. 14

◎ Campaign Influence — Help for this Page ⓘ

Opportunity: Big Deal – 5000 Widgets — 1400

◎ Campaign Influence

| Action | Campaign Name | Contact Name | Contact Role | Responded | Primary Campaign Source |
|---|---|---|---|---|---|
| Edit \| Del | Tradeshow | Jon Amos | Decision Maker | ☑ | ☐ |
| Edit \| Del | 3rd Party Banner Ads | Jon Amos | Decision Maker | ☑ | ☐ |
| Edit \| Del | Tradeshow | Geoff Minor | Business User | ☑ | ☐ |
| Edit \| Del | Tradeshow | Carole White | Evaluator | ☑ | ☐ |
| Edit \| Del | 3rd Party Banner Ads | Carole White | Evaluator | ☑ | ☑ |
| Edit \| Del | B2B Seminar | Carole White | Evaluator | ☑ | ☐ |

FIG. 15

Report Wizard     Help for this Page ⓘ

Select the report type

Select the type of data you wish to report on.

Campaigns [v] [Go!]

- Campaigns
- Campaigns with Contacts
- Campaigns with Leads
- Campaigns with Opportunities
- Campaigns with Campaign Members
- Campaigns with Influenced Opportunities

Campaigns with Influenced Opportunities Report

Campaign Seminar VIP Conference

| Opportunity Name | Amount | Stage |
|---|---|---|
| Gene Point-GC5000 Generators (2) | $125,000 | Qualification |
| Genwatt-Standby Generators (5) | $350,000 | Needs Analysis |
| Acme-Installation Services | $230,333 | Negotiations |
| Grand Total: | $705,000 | |

[Cancel] [Next]

Step 2: Select the report columns

Select the columns to include in your report

FIG. 16a  Jump to Step [Select Columns ▼] [Go!]  Step 2 of 5  [Next]

Select All Columns | Deselect All Columns

Campaign: General
Select All | Deselect All

- ☑ Campaign Name
- ☐ Campaign ID
- ☐ Campaign Type
- ☐ Campaign Status
- ☐ Start Date
- ☐ End Date
- ☐ Campaign Description
- ☐ Active
- ☐ Owner
- ☐ Owner Alias
- ☐ Campaign Type
- ☐ Created Date
- ☐ Last Modified By
- ☐ Created By
- ☐ Created Alias
- ☐ Last Activity
- ☐ Last Modified Alias
- ☐ Last Modified Date

Campaign: Custom Info
Select All | Deselect All

- ☐ DB
- ☐ Master Campaign
- ☐ Old Name
- ☐ Parent Campaign
- ☐ Primary Offer

Member Info
Select All | Deselect All

- ☐ Member Type
- ☐ Member Status
- ☐ Lead/Contact ID
- ☐ Member ID
- ☐ Member First Associated Date
- ☐ Member Status Update Date
- ☐ Member First Responded Date
- ☐ Responded

Opportunity Info
Select All | Deselect All

- ☑ Opportunity Owner
- ☐ Opportunity Owner Alias
- ☐ Created By
- ☐ Created Alias
- ☐ Last Modified By
- ☐ Last Modified Alias
- ☑ Opportunity Name
- ☐ Type
- ☐ Opportunity Record Type
- ☐ Lead Source
- ☐ Partner/Relationship
- ☐ Amount
- ☐ Opportunity Quantity
- ☐ Expected Revenue
- ☐ Close Date
- ☐ Close Month
- ☐ Next Step
- ☐ Stage
- ☐ Probability (%)
- ☐ Fiscal Period
- ☐ Fiscal Year
- ☐ Closed
- ☐ Won
- ☐ Age
- ☐ Stage Duration
- ☐ Forecast Category
- ☐ Owner Role
- ☐ Last Activity
- ☐ Description
- ☐ Created Date
- ☐ Last Modified Date
- ☐ Opportunity ID
- ☐ Campaign Source

FIG. 16b

Opportunity: Custom Info    Select All | Deselect All

- ☐ Closing Countdown
- ☐ Implementation Start
- ☐ Status Indicator
- ☐ cv
- ☐ Projected Durations
- ☐ Status Value
- ☐ Discount (%)
- ☐ Projected Finish
- ☐ Discount Approved
- ☐ Reason Lost

Account: General    Select All | Deselect All

- ☑ Account Name
- ☐ Account Type
- ☐ Ticker Symbol
- ☐ Account ID
- ☐ Account Last Modified Date
- ☐ Person Account Last Name
- ☐ Person Account Lead Source
- ☐ Person Account Last Stay-in-touch Request Date
- ☐ Account State
- ☐ Account Record Type
- ☐ Employees
- ☐ Parent Account
- ☐ Is Person Account
- ☐ Person Account Title
- ☐ Person Account Assistant
- ☐ Person Account Last Stay-in-touch Save Date
- ☐ Rating
- ☐ Annual Revenue
- ☐ Ownership
- ☐ Parent Account ID
- ☐ Person Account Salutation
- ☐ Person Account Asst. Phone
- ☐ Industry
- ☐ SIC Code
- ☐ Account Number
- ☐ Account Created Date
- ☐ Person Acct. First Name
- ☐ Person Acct. Birthdate
- ☐ Person Account
- ☐ Person Account

Account: Address    Select All | Deselect All

- ☐ Billing Street
- ☐ Billing City
- ☐ Shipping Street
- ☐ Shipping City
- ☐ Person Account Mailing Street
- ☐ Person Account Mailing City
- ☐ Person Account Other Street
- ☐ Person Account Other City
- ☐ Billing Address Line 1
- ☐ Billing State/Province
- ☐ Shipping Address Line 1
- ☐ Shipping State/Province
- ☐ Person Acct. Mail. Address Line 1
- ☐ Person Acct. Mail. State/Province
- ☐ Person Acct. Other Address Line 1
- ☐ Person Acct. Other State/Province
- ☐ Billing Address Line 2
- ☐ Billing Zip/Postal Code
- ☐ Shipping Address Line 2
- ☐ Shipping Zip/Postal Code
- ☐ Person Acct. Mail. Address Line 2
- ☐ Person Acct. Mailing Zip/Postal Code
- ☐ Person Acct. Other Address Line 2
- ☐ Person Acct. Other Zip/Postal Code
- ☐ Billing Address Line 3
- ☐ Billing Country
- ☐ Shipping Address Line 3
- ☐ Shipping Country
- ☐ Person Acct. Mail. Address Line 3
- ☐ Person Acct. Mailing Country
- ☐ Person Acct. Other Address Line 3
- ☐ Person Acct. Other Country

FIG. 16c

Accounts: Ph / Fax / URL     Select All | Deselect All

- ☐ Account Phone
- ☐ Person Account Home Phone
- ☐ Account Fax
- ☐ Person Acct. Other Phone
- ☐ Website
- ☐ Person Account E-mail
- ☐ Person Account Mobile
- ☐ Person Acct. E-mail Opt Out

Account: Custom Info     Select All | Deselect All

- ☐ Account Priority
- ☐ DB
- ☐ Map the Account
- ☐ Other Income
- ☐ Person Account Latitude
- ☐ Account Rating
- ☐ Latitude
- ☐ Net Worth
- ☐ Personal Assets
- ☐ Person Account SSP User
- ☐ Annual Income
- ☐ Liabilities
- ☐ Old Name
- ☐ SLA Expiration Date
- ☐ Person Account Longitude
- ☐ Customer Value
- ☐ Longitude
- ☐ OSKeyID
- ☐ SLA Level

Contact Role: General     Select All | Deselect All

- ☐ Salutation
- ☐ Contact ID
- ☐ Contact Account
- ☑ First Name
- ☑ Title
- ☐ Contact Role
- ☑ Last Name
- ☐ Department
- ☐ Contact is Person Account
- ☐ Primary

Contact Role: Ph / Fax / E-mail     Select All | Deselect All

- ☑ Phone
- ☐ Other Phone
- ☐ Fax
- ☑ Email
- ☐ Mobile
- ☐ Email Opt Out
- ☐ Home Phone

Contact Role: Address     Select All | Deselect All

- ☑ Mailing Street
- ☑ Mailing City
- ☐ Other Street
- ☐ Other City
- ☐ Mailing Address Line 1
- ☑ Mailing State/Province
- ☐ Other Address Line 1
- ☐ Other State/Province
- ☐ Mailing Address Line 2
- ☑ Mailing Zip/Postal Code
- ☐ Other Address Line 2
- ☐ Other Zip/Postal Code
- ☐ Mailing Address Line 3
- ☑ Mailing Country
- ☐ Other Address Line 3
- ☐ Other Country

Contact: Custom Info     Select All | Deselect All

- ☐ Latitude
- ☐ Longitude
- ☐ SSP User

[Run Report...] [Export Details] [Printable View] [Saved As]     [Cancel] [Next]

FIG. 17

Report Options:

Summarize Information by:

Campaign Name [v]

| Timeframe | | |
|---|---|---|
| Date | Duration | |
| Close Date [v] | Current FQ [v] | |
| | Start Date | End Date |
| | 4/1/2008 | 6/30/2008 |

View: All opportunities [v]

[Run Report] [Hide Details] [Customize] [Save As] [Printable View] [Export Details]

Generated Report:

| Full Name | Role | Account Name: Account Name | Opportunity Name | Probability (%) | Amount |
|---|---|---|---|---|---|
| ☐ Campaign Name: Email – Network Management Promotions | | (1 record) | | | $12,500.00 |
| Alex Carter | Business User | Strickland Propane | Strickland Propane – 100 Widgets | 10% | $12,500.00 |
| ☐ Campaign Name: Internet Search – Secure Networking Guide | | (3 records) | | | $67,750.00 |
| Alex Carter | Business User | Strickland Propane | Strickland Propane – 100 Widgets | 10% | $12,500.00 |
| Ramon Cardenas | Economic Decision Maker | ABC Company | ABC Co - 1500 Widgets | 10% | $30,250.00 |
| Greg Tate | Influencer | Tate Supplies | Tate Supplies- | 20% | $25,000.00 |
| Grand Totals (4 records) | | | | | $67,750.00 |

1700

Check rows above to filter just those rows, then drill down by: [--None--] [v] [Drill Down]

What is Campaign Influence?

Campaign Influence allows marketers to measure and report on all campaigns that have influenced an opportunity or contacts that are tied to the opportunity through contact roles

How does Campaign Influence Work?

Campaigns can be attributed to opportunities in 2 ways. You can manually add a campaign to the Campaign Influence Related List on Opportunities or you can associate a campaign to any of the contacts that are related to the opportunity via the contact role given that the campaign is associated to the contact prior to the close date of the opportunity To customize the criteria used to determine campaigns that should be counted as influenced, use the filters below

Filter Criteria   Campaign Influence Lifetime  equals 120 Days
                     Campaign Member Response  equals true
                     Opportunity Record Type  equals Sales

| Campaign Influence | Help for this Page (?) |
|---|---|

Campaign influence allows marketers to measure and report on multiple campaigns that have influenced a single opportunity. Influential campaigns can be associated to opportunities manually or automatically.

[Save]  [Cancel]

| Step 1: Enable or Disable   Automatic Association |
|---|

Automatic Association
Enabled ◉
Associates campaigns to opportunities when campaigns when campaigns are related to a contact prior to the opportunity close date.
Disabled ○
Users must designate influential campaigns using the related list on the Opportunity.

| Step 2: Create   Association Rules |
|---|

Association rules create additional criteria for automatic association.

| | Field | Operator | Value | AND/OR |
|---|---|---|---|---|
| 1. | Campaign Influence Timeframe [v] ⓘ | Equals [v] | | AND [v] |
| 2. | --None-- [v] | Equals [v] | | AND [v] |
| 3. | --None-- [v] | Equals [v] | | AND [v] |
| 4. | --None-- [v] | Equals [v] | | AND [v] |
| 5. | --None-- [v] | Equals [v] | | |

[Save]   [Save & New]   [Cancel]

METHOD AND SYSTEM FOR APPORTIONING OPPORTUNITY AMONG CAMPAIGNS IN A CRM SYSTEM

CLAIM OF PRIORITY

This application claims the benefit of U.S. Provisional Patent Application 61/191,900 entitled METHOD AND SYSTEM FOR APPORTIONING OPPORTUNITY AMONG CAMPAIGNS IN A CRM SYSTEM, by Collins et al., filed Sep. 12, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 12/584,955 entitled Method And System For Apportioning Opportunity Among Campaigns In A CRM System, by Jesse Collins et al., filed Sep. 14, 2009.

FIELD OF THE INVENTION

The current invention relates generally to a method and system for apportioning opportunity among campaigns in a CRM system in an on-demand service in a database network system, and more particularly to a method and system for apportioning opportunity among campaigns in a CRM system in an on-demand service in a multi-tenant database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional sales application database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The efficient and rapid retrieval of accurate information and subsequent delivery of this information in a manner that is responsive to the user request has been and continues to be a goal of administrators of database systems.

Unfortunately, in conventional databases, the lookup of a relationship between an opportunity and campaign does not accurately reflect the true opportunity campaign relationship. In reality, it is usually a combination of campaigns that created the opportunity and influenced the deal. Marketers want to see the true number and value of the opportunities that are being influenced (e.g., touched) by their campaigns so they know what programs they should invest money in, regardless of the direct Return On Investment.

Accordingly, it is desirable to provide techniques for enabling the apportioning of opportunity among campaigns in an on-demand service in a database system in a manner that improves the accuracy of determining the influence of campaigns on opportunities.

BRIEF SUMMARY

In accordance with embodiments, there are provided mechanisms and methods for providing apportioning of opportunity among campaigns in an on-demand service in a database system. These mechanisms and methods for providing apportioning of opportunity among campaigns can enable embodiments to dynamically provide a filtered set of campaigns in response to user queries. The ability of embodiments to provide a dynamically filtered set of campaigns allows users to quickly and efficiently determine which opportunities have been influenced by which campaigns.

In an embodiment and by way of example, a method for providing apportioning of opportunity among campaigns in an on demand service is provided. The method embodiment includes receiving a request for information from a tenant, dynamically determining which campaigns influenced which opportunities or which opportunities influenced which campaigns, and providing a filtered set of campaigns in response to the request.

In an embodiment, a campaign influence feature may allow users to establish which opportunities a campaign influenced by using a table having information about campaigns, a table having information about opportunities and a table having information about contacts to dynamically determine which campaigns influenced an opportunity (or which opportunities were influenced by a campaign).

In an embodiment, an opportunity is determined to be related to a campaign if the opportunity and campaign have a common contact. Determining which campaigns affect an opportunity may be used to determine how the opportunities and campaigns influenced one another. In an embodiment, the customer may be able to customize criteria to filter which campaigns are considered to be influencing an opportunity. For example, the result may be limited to a specific time period. In particular, the results may be limited to including a time period during which the campaign could have influenced an opportunity, represented by only the maximum number of days between the days of the campaign first associated dates (=created_date column of campaign_member table) and the opportunity create dates. The opportunity create date is the date that an opportunity was created and the campaign first associate date is the first date that the campaign was associated with a particular sales representative. In other words, the search results may be limited to the time period between the first campaign associate date and the last opportunity create date.

In addition, in an embodiment, the customer may be able to manually add or delete campaigns from the list of influencing campaigns by interacting with the opportunity detail page.

While the present invention is described with reference to an embodiment in which techniques for on-demand apportioning of opportunity among campaigns in a CRM system are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 8 is a sample of the contents of a prior campaign_member table.

FIG. 9 is a refactored campaign_member table that has an added Boolean column.

FIG. 11 is an example of the details of the columns for the table campaign_influence_adj.

FIG. 12 is a screenshot of an embodiment of the opportunity application with the campaign influence feature.

FIG. 14 is a screenshot of an embodiment of a campaign influence list.

FIG. 15 is a screenshot of an embodiment of a report menu for generating a campaign with influenced opportunities report.

FIG. 16*a*, FIG. 16*b*, and FIG. 16*c* are screenshots of an embodiment of a criteria options list for generating campaign influence reports.

FIG. 17 is a screenshot of an embodiment of a generated campaign influence report.

FIG. 18 is a screenshot of an embodiment of a dialogue box for setting campaign influence filter criteria.

FIG. 19 is a screenshot of an embodiment of a dialogue box for enabling automatic rule association and creating association rules.

DETAILED DESCRIPTION

General Overview

Systems and methods are provided for providing apportioning of opportunity among campaigns in an on-demand service.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

The naming convention used to describe elements in example embodiments, where underscores are employed in the name, are representative of the contents of the element if the underscores were to be removed. Where the element is a database table, any table with similar contents may be used instead of the named table with underscores and where the element is a database column, any column with similar contents may be used instead of the named column with underscores. Additionally, term "_id" is used as a representative abbreviation for the word identification and the term "_adj" is used as a representative abbreviation for the word adjustment.

The following begins with a system overview describing the components of a system for providing apportioning opportunity among campaigns in an on-demand service. Then, mechanisms and methods for providing apportioning opportunity among campaigns in an on-demand service will be described with reference to example embodiments.

System Overview

Figure 1:
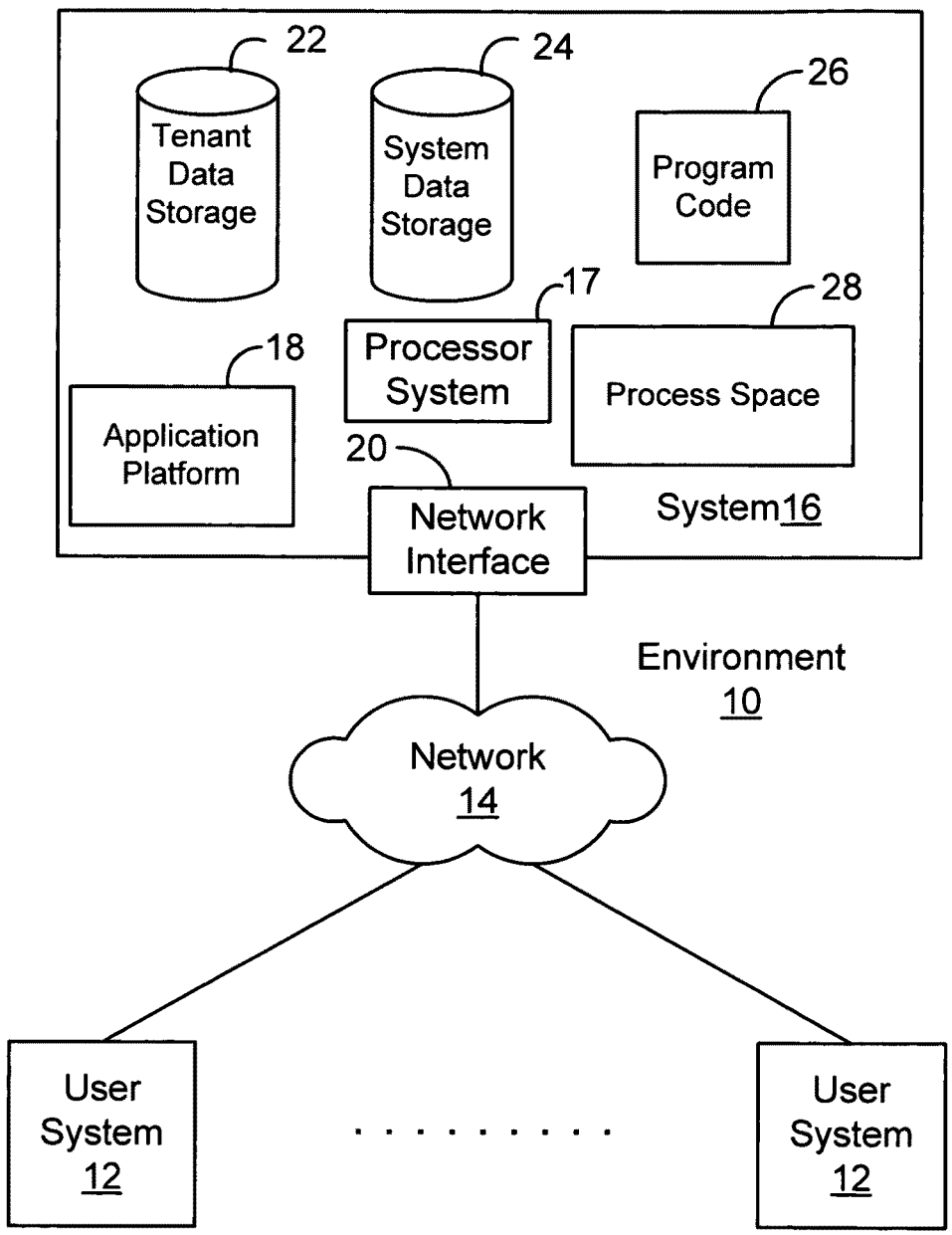
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
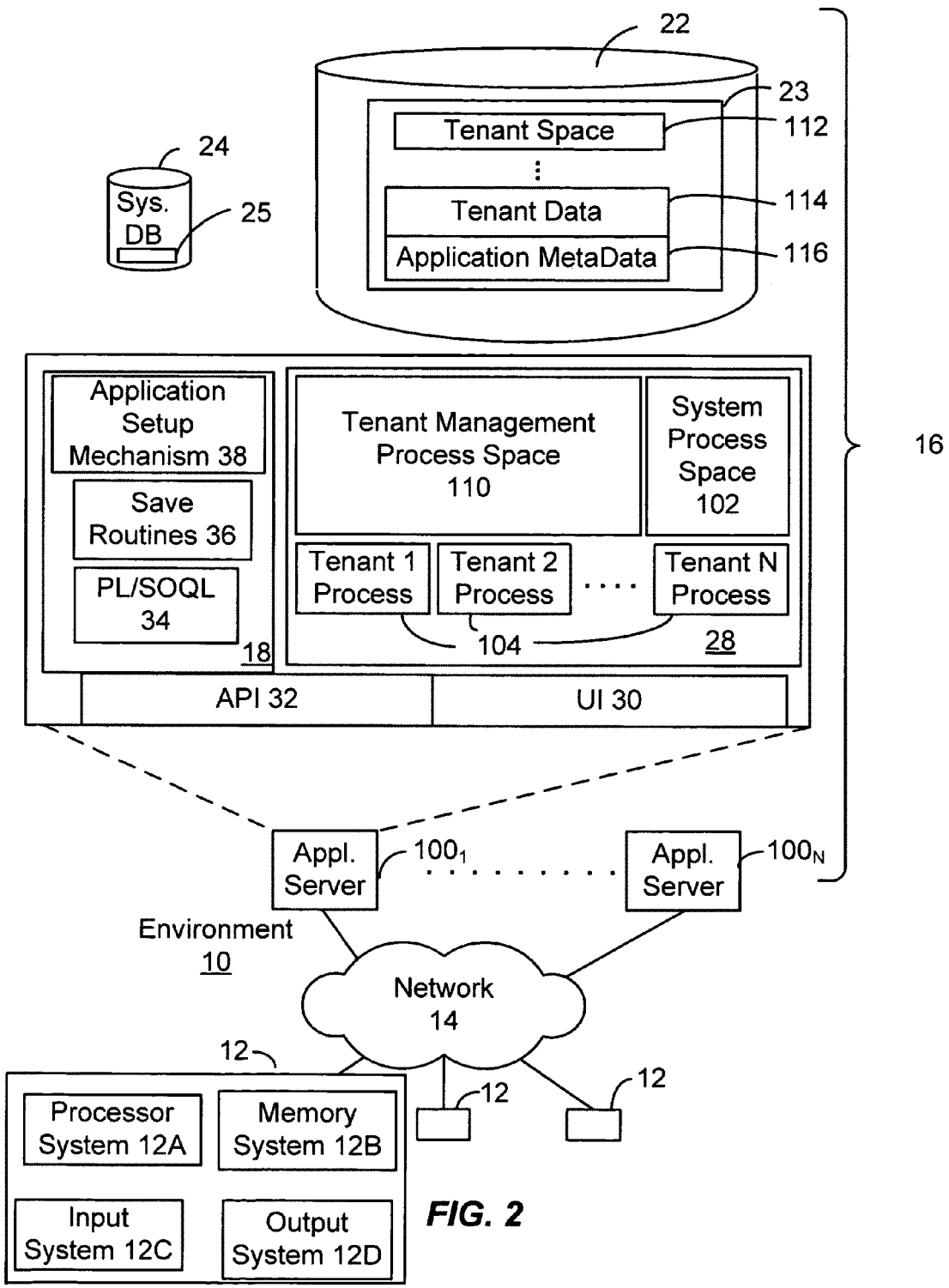
FIG. 2 illustrates elements of FIG. 1 and various possible interconnections between these elements in an embodiment.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more. Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Tenant Process

Figure 3:
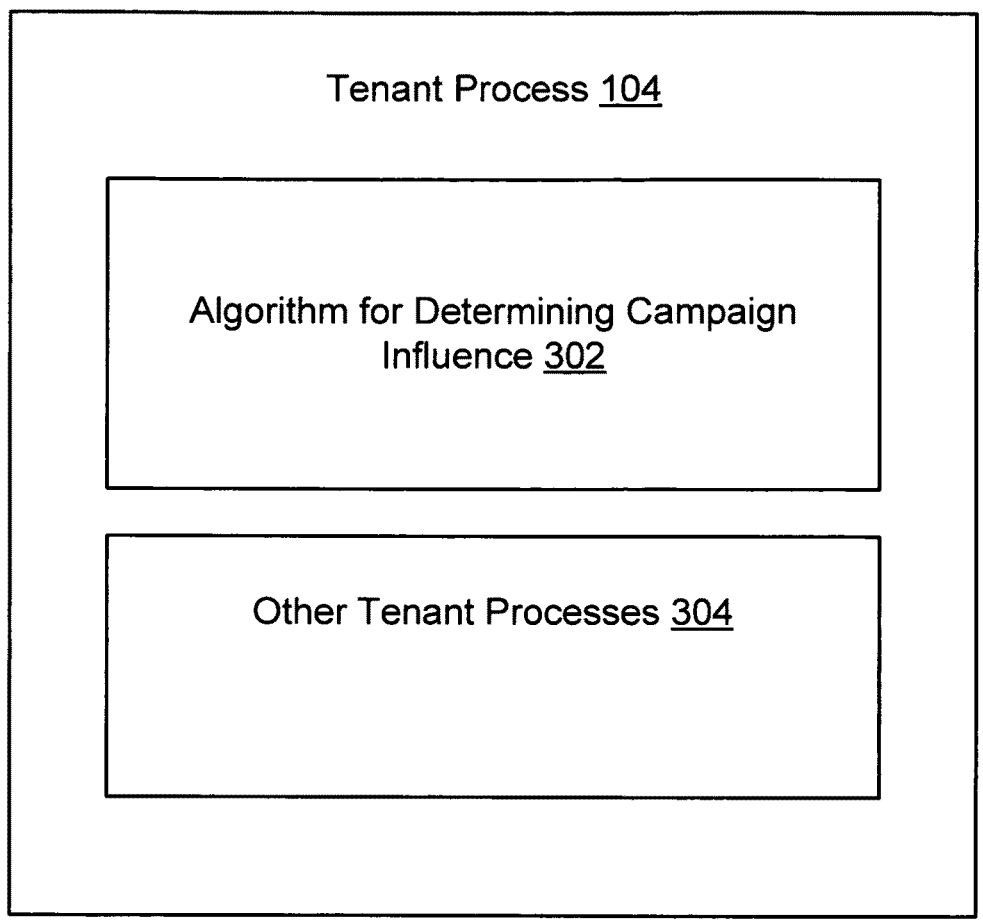
FIG. 3 shows a block diagram of an embodiment of the tenant process of FIG. 2.

FIG. 3 shows a block diagram of an embodiment of tenant process 104. Tenant process 104 may include algorithm for determining campaign influence 302. Tenant process 104 may further include other tenant processes 304. In other embodiments, tenant process 104 may not have all of the elements listed and/or may have other elements instead of or in addition to those listed.

Algorithm for determining campaign influence 302 is an algorithm used for determining which campaigns are influencing a particular opportunity. For example, algorithm for determining campaign influence 302 may have logic such that all campaigns that are associated to an opportunity via a contact role where the first associated date is prior to the opportunity close date are categorized as an influencing opportunity. Algorithm for determining campaign influence 302 may include one or more database statements for creating a mapping table that aggregates information from several tables, such as a table with information about campaigns, a table with information about opportunities, and a table with information about contacts (a mapping table is a table that takes information from other tables, such as by joining or otherwise combining the information from different tables). The algorithm for determining campaign influence 302 may create the mapping table dynamically while the user is interacting with the on-demand service. Optionally, creating the mapping table dynamically permits the user to change the campaigns influencing an opportunity without the database having to store a separate table for each opportunity. Additionally, algorithm for determining campaign influence 302 may have logic such that any campaign that is manually added is also categorized as an influencing opportunity. Other tenant processes 304 may include any of a number of other tenant processes.

Server-Side Method of Apportioning Opportunity Among Campaigns

Figure 4:
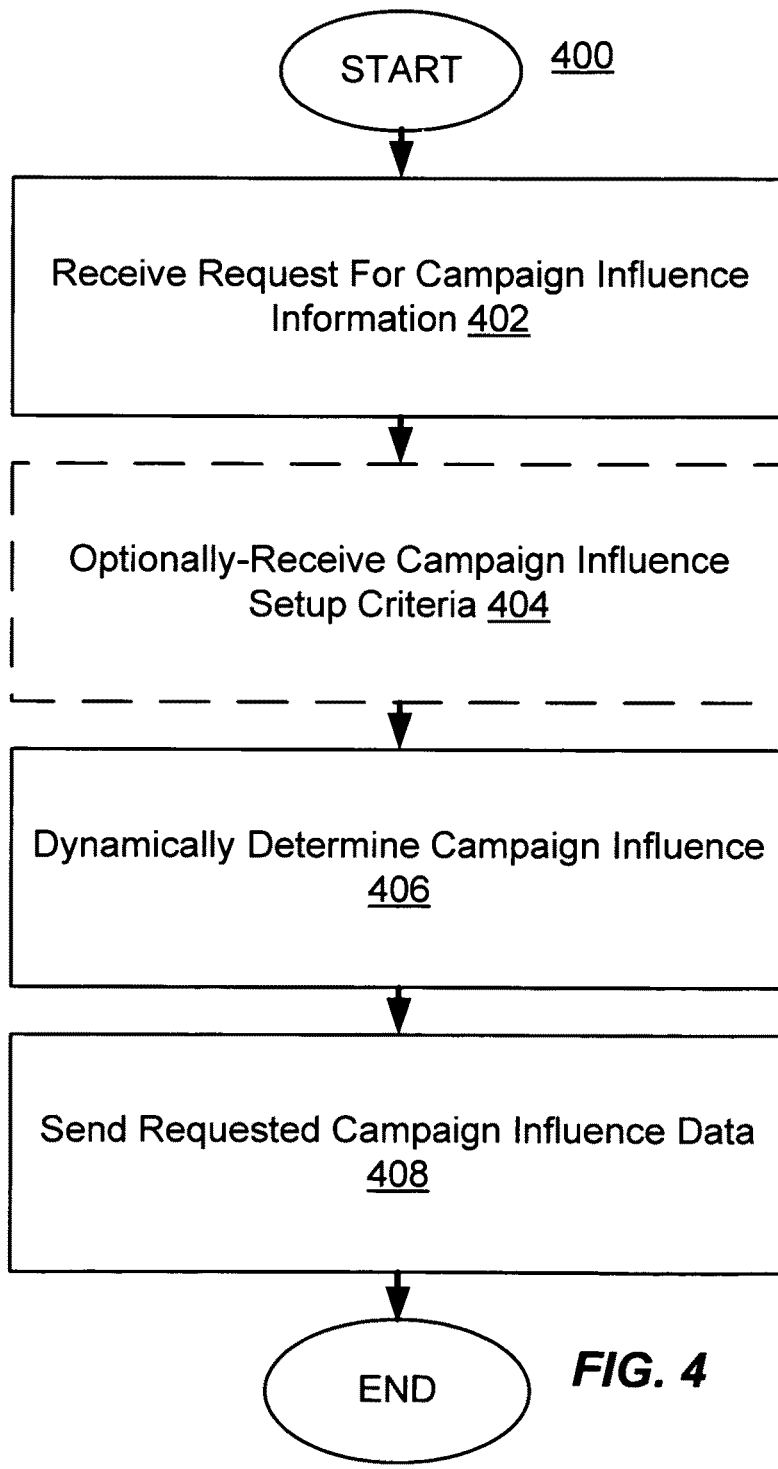
FIG. 4 shows a flowchart of an embodiment of a method for apportioning opportunity among campaigns implemented at the server.

FIG. 4 shows a flowchart of an embodiment of a server side method for apportioning opportunity among campaigns. In step 402, system 16 may receive a request for marketing information, which optionally may include a request for campaign influence information from a user system 12. Optionally, in step 404, system 16 may receive additional campaign influence setup criteria information, such as filtering information. For example, user system 12 may send additional campaign influence setup criteria such as limiting results to a time period with particular start and end dates or limiting results to only those opportunities that have a particular primary influencing campaign. Alternatively, user system 12 may send additional campaign influence setup criteria such as information specifying campaign influence report columns. In step 406, in response to the user request for campaign influence information, system 16 dynamically determines which opportunities have been influenced by which campaigns and optionally applies the additional campaign influence setup criteria as necessary. In step 408, in response to the user request for campaign influence information, system 16 sends the requested campaign influence information.

In an embodiment, each of the steps of method 400 is a distinct step. In another embodiment, although depicted as distinct steps in FIG. 4, steps 402-408 may not be distinct steps. In other embodiments, method 400 may not have all of the above steps and/or may have other steps in addition to, or instead of, those listed above. The steps of method 400 may be performed in another order. Subsets of the steps listed above as part of method 400 may be used to form their own method.

Client-Side Method of Apportioning Opportunity Among Campaigns

Figure 5:
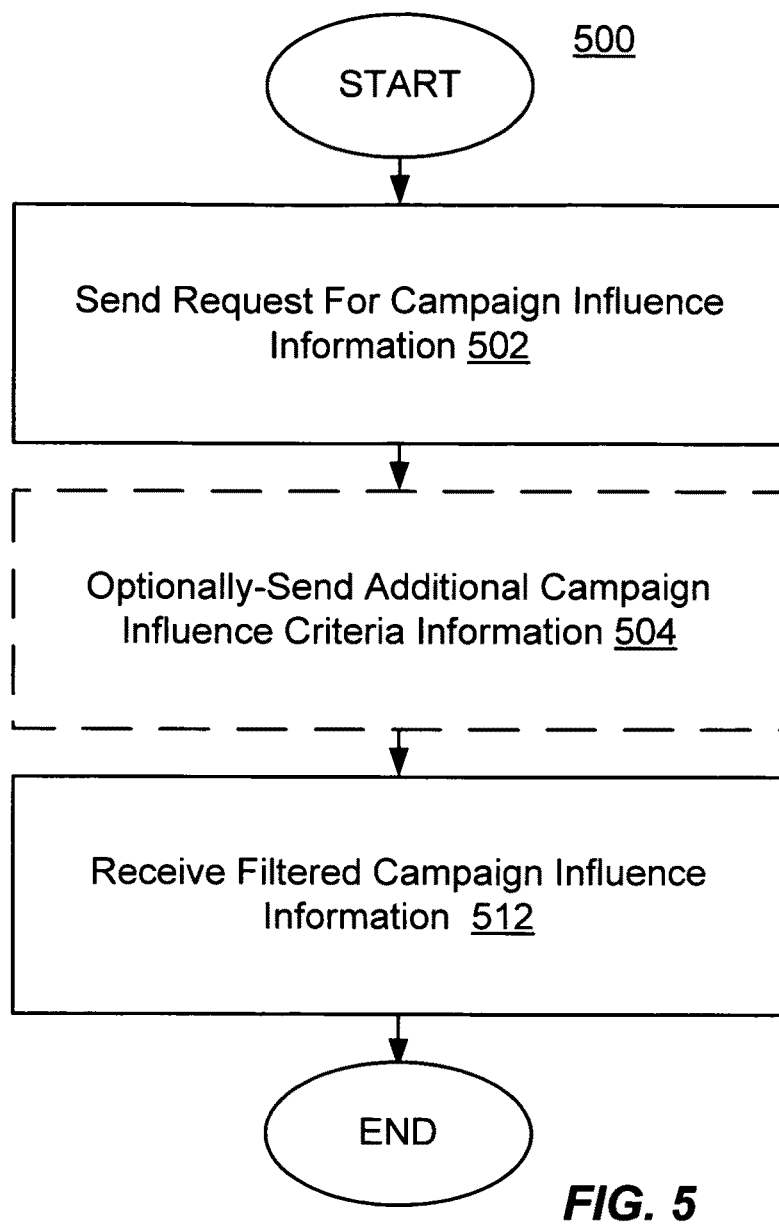
FIG. 5 shows a flowchart of an embodiment of a method for apportioning opportunity among campaigns implemented on the user side.

FIG. 5 shows a flowchart of an embodiment of a method for apportioning opportunity among campaigns implemented on the client side. In step 502, the user may send a request to receive campaign influence information. Optionally, in step 504, the user may send additional campaign influence criteria information to filter campaigns based on desired campaign influence criteria. In step 506, the user receives dynamically determined and filtered campaign influence information.

In an embodiment, each of the steps of method 500 is a distinct step. In another embodiment, although depicted as distinct steps in FIG. 5, steps 502-506 may not be distinct steps. In other embodiments, method 500 may not have all of the above steps and/or may have other steps in addition to, or instead of, those listed above. The steps of method 500 may be performed in another order. Subsets of the steps listed above as part of method 500 may be used to form their own method.

Figure 6:
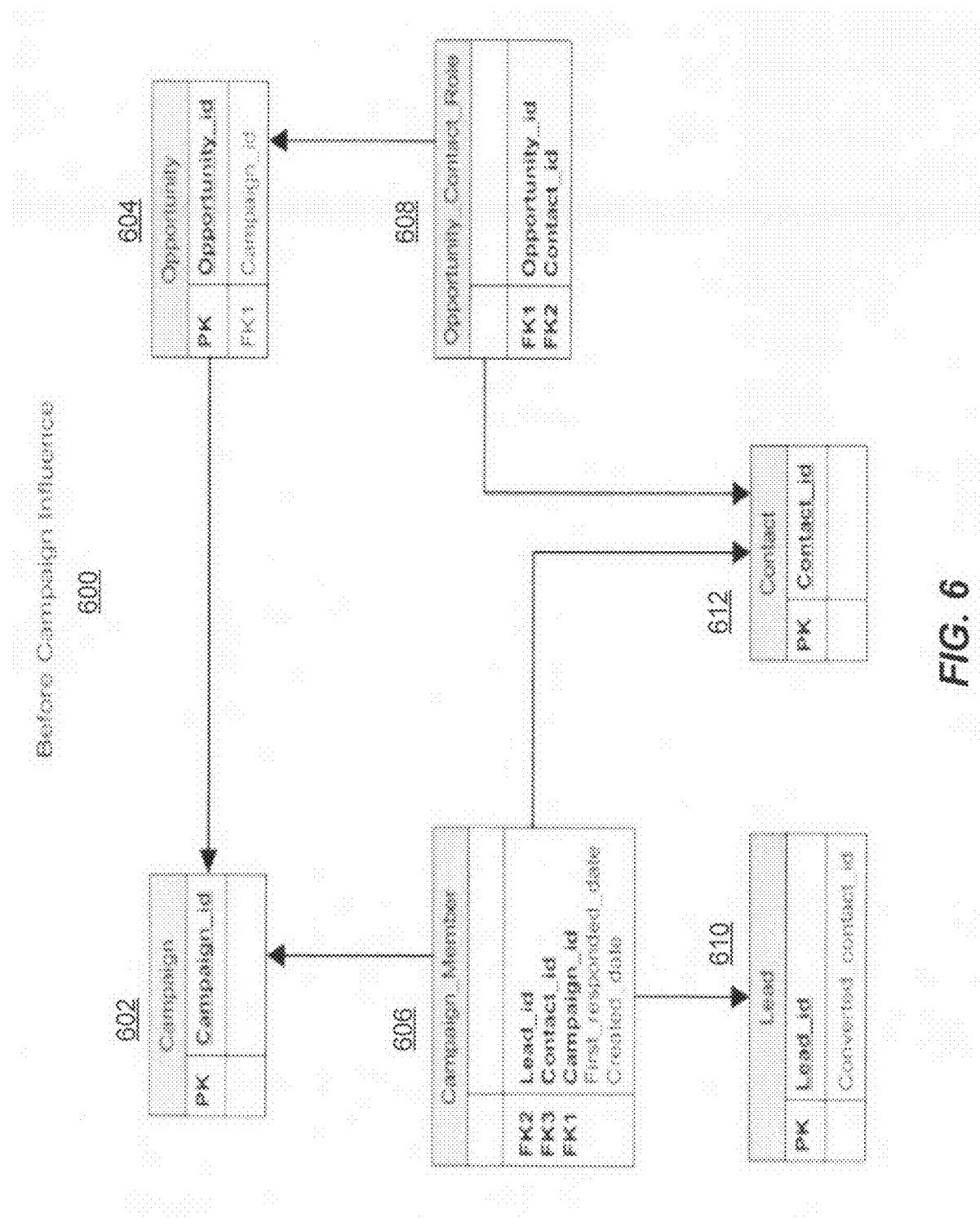
FIG. 6 is an entity relationship diagram that represents the data model for campaign to opportunities relationship without the campaign influence feature.

A Data Model for Determining Opportunity to Campaign Relationships without a Campaign Influences Feature FIG. 6 is an entity relationship diagram that represents a data model for determining a campaign to opportunities relationship without the campaign influence feature described further below. Database schema 600 may include campaign 602, opportunity 604, campaign_member 606, opportunity_contact_role 608, lead 610 and contact 612.

Database schema 600 defines the tables, fields, and dependencies of the prior data model for campaign to opportunity relationships. Campaign 602 is a table with primary key campaign_id and contains a list of campaigns accessible to the user. Campaign 602 may additionally contain campaign identifying information and details such as campaign owner, campaign name, type of campaign, status of campaign, description of campaign, start and end date of the campaign, expected revenue, campaign budget, etc. Opportunity 604 is a table with primary key opportunity_id and foreign key campaign_id. Opportunity 604 may contain a list of opportunities and additional opportunity identification information, such as opportunity owner, associated account name, opportunity type, primary campaign source indication, opportunity contact, opportunity value, close date of the opportunity, etc. Campaign_member 606 is a table which includes a join between campaign 602, lead 610, and contact 612 and has foreign keys campaign_id, contact_id, and lead_id. Campaign_member 606 may allow a user to determine which leads and contacts are associated with a particular campaign. Opportunity_contact_role 608 is a table that includes a join between opportunity 604 and contact 612 and has foreign keys opportunity_id and contact_id, and may contain information about the roles of contacts and which opportunity the contact is associated with, for example. Lead 610 is a table with primary key lead_id and contains a list of leads for opportunities. Lead 610 may optionally contain additional lead identifying information and details. Contact 612 is a table with primary key contact_id and contains a list of contacts at different companies and optionally may include other identifying information about the contacts such as contact name, contact, owner, account associated with the contact, title of the contact, phone number, electronic mailing address, etc.

Database schema 600 is an example of the data model for campaign to opportunity relationships without the campaign influence feature. The look up of a relationship from opportunity to campaign aggregates information from opportunities and campaigns. However, the information that is retrieved by looking up the campaign opportunity relationship results in a one to one relationship between opportunity and campaign and may not be truly representative of the many campaigns that may have influenced an opportunity.

Campaign Influence Feature

Figure 7:
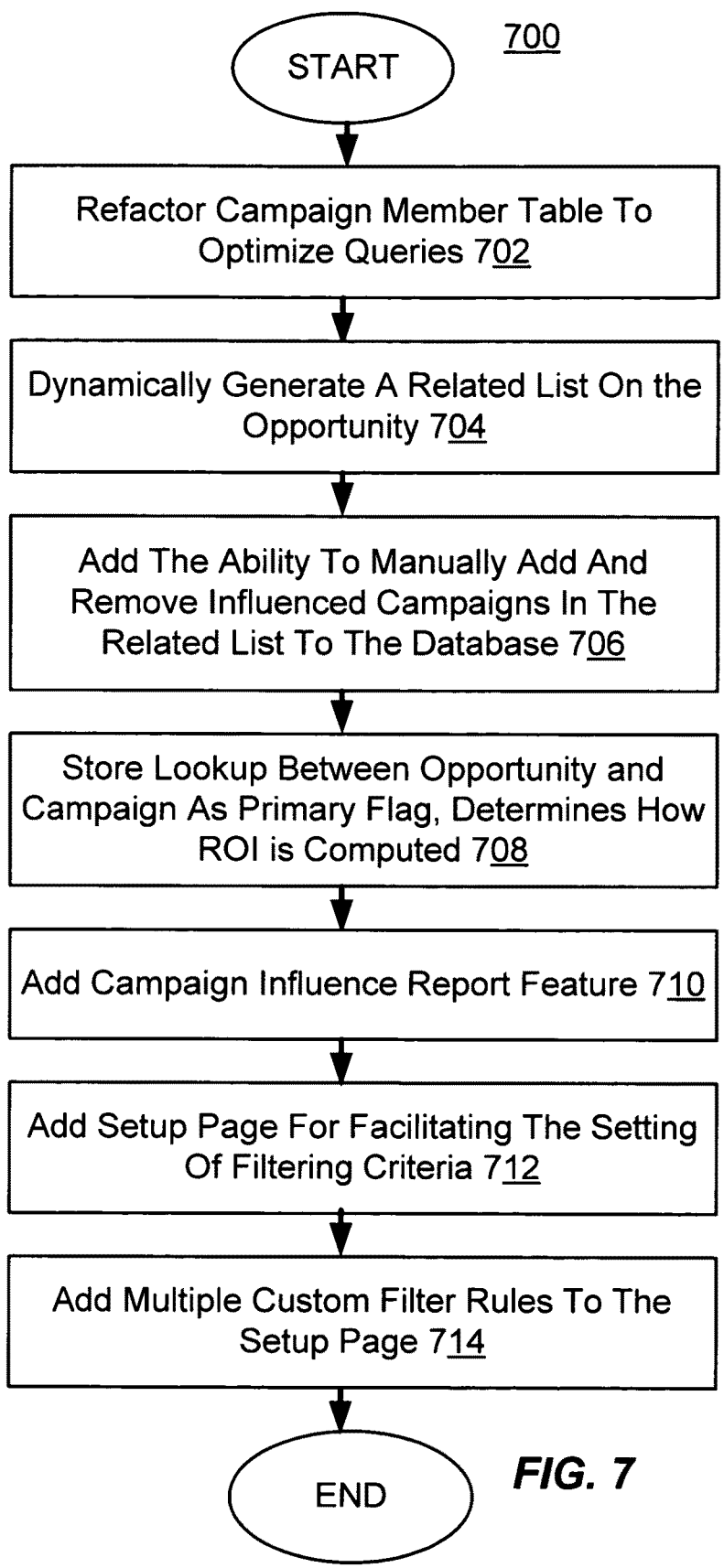
FIG. 7 shows a flowchart of an embodiment of a method for implementing the campaign influence feature.

FIG. 7 shows a flowchart of an embodiment of a method for implementing the campaign influence feature. In step 702, if there was a prior campaign_member table 606 that was not optimized for determining campaign influences, some rows may need to be de-duplicated. In an embodiment, the campaign_member 606 table may be refactored to optimize queries that join the campaign 602 and contact 612 tables. In step 704, a related list on the opportunity may be dynamically generated by joining campaign 602, the campaign_member 606, the opportunity_contact_role 608, and opportunity tables 604, with one or more filtering criteria that are desired to be defaults, such as a requirement that the date associated with the campaign_member 606 and the created date must be prior to opportunity close date. In step 706, the ability to manually add and remove influenced campaigns in the related list is added to the database. In an embodiment, the ability to manually add and remove influenced campaigns may be achieved by introducing a mapping table, which may be referred to as, campaign_influence_adj, which may store manually added and/or deleted combinations of a campaign id (e.g., stored in campaign_id), opportunity id (e.g., stored in opportunity_id), contact id (stored in contact_id). In an embodiment, the campaign influence related list is updated to join and/or a union is performed to this table that contains the manually added and/or deleted influenced campaign.

In step 708, the prior existing lookup between opportunity and campaign may also be stored as a row in the new campaign_influence_adj table, with a "primary" flag set to true. The primary flag determines how the return on investment (ROI) is computed. In an embodiment, if no primary flag is set to true, the ROI may be set to −100%, but is otherwise not calculated. In an embodiment, if a primary flag is true for a particular row, the investment amount (that is used for computing the ROI) is the investment indicated on the campaign tied to the opportunity of that row. Thus, the ROI is calculated for a particular opportunity campaign combination that is selected as primary. The "primary campaign" is the campaign that is listed in the campaign source field on the opportunity. In an embodiment, updating and/or deleting a campaign id in an existing lookup may update that row, such as by deleting the row if the campaign id was deleted and adding the information pertinent to the new campaign, if the campaign id was changed. In an embodiment, the primary flag will be shown and editable in the related list (only one campaign can be marked as primary). Changing the primary campaign in the related list should also update the existing campaign lookup to the new campaign. In an embodiment, an upgrade script may copy existing campaign-opportunity relationships into the new campaign_influence_adj table. In step 710, a report type, which may be called Campaign Influence Report is added, which may include information from a campaign_influence_adj table. The campaign_influence_adj table may be derived by a join of campaign 602, contact 612, and opportunity 604 using the same filtering criterion as the related list.

In step 712, a setup page may be added to facilitate setting the filtering criteria. By interacting with the setup page, additional custom filtering criteria may be defined by the user (in addition to the criterion discussed above), which may be applied to both the related list and the report. The custom filters may be stored in a filter table, which may be called the core.filter tables. A list and/or report column, which may be called Campaign Influence Lifespan (the campaign influence lifespan is given by the number of days between Campaign_Member.created_date and Opportunity.created_date) may be added so that the user can create a filter on that column (to specify that it should be less than a max number of days, for example). In step 714, multiple custom filter rules may be added to the new setup page, which may add the ability to specify different custom filters for different sets of campaigns. Each set of campaigns is defined by a separate filter criteria, such as a record type.

In an embodiment, each of the steps of method 700 is a distinct step. In another embodiment, although depicted as distinct steps in FIG. 7, steps 702-714 may not be distinct steps. In other embodiments, method 700 may not have all of the above steps and/or may have other steps in addition to, or instead of, those listed above. The steps of method 700 may be performed in another order. Subsets of the steps listed above as part of method 700 may be used to form their own method.

To the user, the campaign influence feature may include (among other things) one or more of the following features: (1) A relationship list that is specialized for and/or dedicated to the influence of campaigns, which may be referred to as a campaign influence related list, that is located in the opportunity page, and that has the ability to manually add and/or and remove influencing campaigns. (2) A report type that is specialized for and/or dedicated to representing the influence of campaigns may be included. The specialized report type may include information about the influences of the campaigns on opportunities. (3) A setup page that is specialized for, and/or dedicated to, setting up the information that is retrieved and the places that are searched for information about the influence of campaigns. The setup page may be used to the customize filters that are used to determine which campaigns are influencing an opportunity.

FIG. 8 is a sample of the contents of a campaign member table 606 before the campaign influence feature. In the data model before the campaign influence feature, the same contact_id may have shown up in multiple rows in campaign_member table 606 in instances where multiple leads were converted to the same contact. Therefore, for queries joining campaign 602 to contact 612, there may be a need to deduplicate rows in which the same contact_id appear. The multiple rows corresponding with contact 3 in FIG. 8 would require deduping.

The addition of the campaign influence feature may add more complexity by joining multiple tables. To avoid the costly operation of deduplicating rows that have an identical contact_id, in an embodiment, the campaign_member table 606 is refactored to optimize queries that join the campaign 602 and contact 612 tables (refactoring is a change to a database schema that improves its design while retaining both its behavioral and informational semantics, while leaving the database functioning). The campaign_member table 606 may be refactored by adding a new boolean column called primary. This flag may be set to true for (1) all campaign_member rows where the lead_id is null (2) for rows where lead_id is not null, the row may be grouped by contact_id, and the row may be marked with the most recent first_responded_date or created_date (if first_responded_date is null) as primary and (3) the flag will be false for all other rows.

FIG. 9 is a refactored campaign_member table that includes an added boolean column. The refactoring of the sample campaign_member table of FIG. 8 results in the refactored campaign_member table of FIG. 9. The added Boolean column of FIG. 9, called primary, illustrates how the flag is set to true according to the rules detailed in the description of FIG. 8 above. The added Boolean column, primary, may greatly simplify the join between campaign 602 and contact 612 by adding, "campaign_member.primary=true" to the where clause, and then removing any de-duplicating logic. As described earlier, if no opportunities exist with primary flag=true and the investment amount is greater than $0, the ROI will be −100%. If a particular row has a true primary flag, the investment amount used for calculating the return on investment is the investment indicated on the campaign tied to the opportunity of that row.

Figure 10:
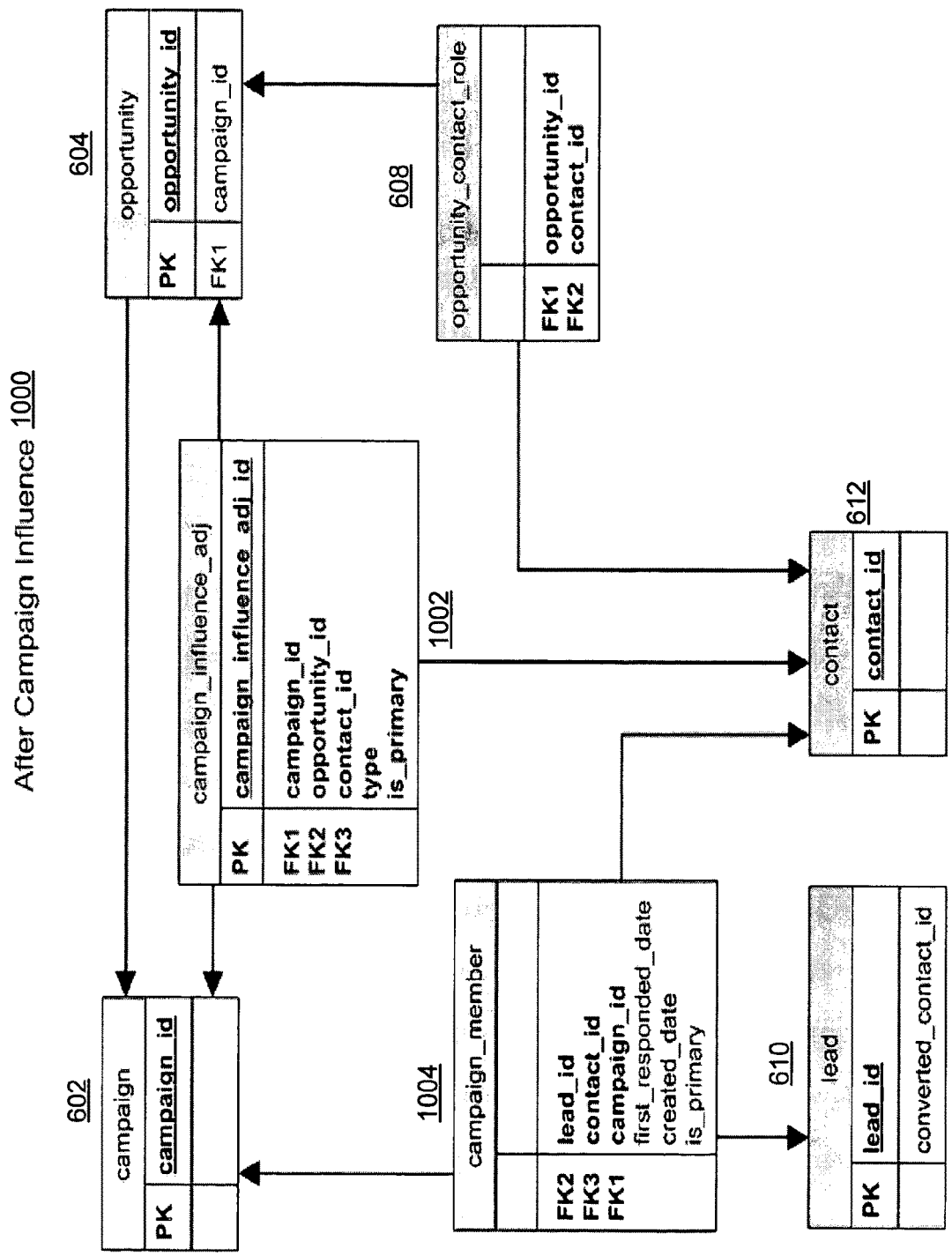
FIG. 10 is an entity relationship diagram that represents the new data model which includes the campaign influence feature.

FIG. 10 is an entity relationship diagram that represents the new data model including the campaign influence feature. Database schema 1000 may include campaign 602, opportunity 604, refactored campaign member 1004, opportunity_contact_role 608, lead 610, contact 612, and campaign_influence_adj 1002. In other embodiments, database schema 1000 may not have all of the elements listed and/or may have other elements instead of or in addition to those listed.

Campaign 602, opportunity 604, opportunity_contact_role 608, lead 610, and contact 612 have been previously described in the detailed description of FIG. 6 above. Campaign_influence_adj 1002 is a table created by a join between campaign 602, campaign member 606, contact 612, opportunity contact role 608, and opportunity 604. In an embodiment, campaign_influence_adj 1002 provides the ability to manually add and remove influenced campaigns to an opportunity related list. Refactored campaign member 1004, in an embodiment may allow a user to determine which leads and contacts are associated with a campaign. Additionally, in an embodiment, multiple contacts may be attached to the same campaign, which may in turn be added to the same opportunity via different opportunity contact roles. These different contacts may appear as separate in the campaign influence related list.

FIG. 11 is an example of the details of the columns for the table campaign_influence_adj 1002. The campaign_id, opportunity_id, and contact_id are foreign keys for the table campaign_influence_adj 1002. As mentioned previously, the prior lookup between opportunity 604 and campaign 602 may be refactored in addition to being stored in the opportunity 604 table, the prior lookup may also be stored as a row in campaign_influence_adj table 1002 with the "primary" flag set to true, type='a', contact_id=null. The primary flag may be shown in the related list and the primary flag may be editable (only one campaign can be marked as primary). In an embodiment, the campaign_influence_adj table 1002 may maintain (e.g., update) the lookup field from opportunity to campaign, whenever the primary campaign is changed. In an embodiment, the user is allowed to change the primary campaign by using the legacy lookup field. If the user changes the primary campaign by using the legacy lookup field, the corresponding row in the campaign_influence_adj table 1002 may be updated. An upgrade script may be activated to migrate existing campaign-opportunity relationships into the campaign_influence_adj table 1002. In an embodiment, the presence of a primary row is not required for a given opportunity, but there can be at most one primary row per opportunity.

FIG. 12 is a screenshot of an embodiment of opportunity webpage 1200 including the campaign influence feature and containing at least in part, opportunity table 604. Opportunity webpage 1200 may include opportunity details 1202, edit button 1204, delete button 1206, clone button 1208, sharing button 1210, campaign influence 1212, add campaign button 1214, campaign influence action buttons 1216, campaign influence campaign names 1218, campaign influence contact names 1220, campaign influence role 1222, campaign influence primary campaign indicator 1224, campaign influence help 1226, campaign influence first associated date 1228, and contact roles 1230. In other embodiments, opportunity webpage 1200 may not have all of the elements listed and/or may have other elements instead of or in addition to those listed.

Opportunity details 1202 may contain and display information related and associated with an opportunity. Opportunity details 1202 may use and display data stored in opportunity table 604. For example, in an embodiment opportunity details 1202 may display opportunity information such as opportunity owner, name of the opportunity, account name of the opportunity, campaign source that created the opportunity, close date of the opportunity, the stage of the opportunity, probability of successfully closing the opportunity and the potential dollar amount of the opportunity. Optionally, opportunity details 1202 may display additional information such as lead source, next step in opportunity handling, and a description of the opportunity. Edit button 1204 may allow a user to edit information contained in opportunity table 604. For example, if an opportunity has been given an extension of time to be considered successfully closed, edit button 1204 may be used to change the close date of the opportunity to the new extended close date. Delete button 1206 may allow a user to delete an opportunity. For example, if an opportunity is no longer available, delete button 1206 may be used to remove the opportunity record. Clone button 1208 may be used to quickly create a new opportunity with the same opportunity information as the existing opportunity. For example, a new opportunity with the same owner, the same account name, and the same campaign source, may be cloned in an effort to allow the user to quickly create a new opportunity entry without having to reenter the same information. The user may then simply add or edit additional opportunity detail information to accurately reflect the new opportunity. Sharing button 1210 may allow a user to share opportunity detail information with other users of the tenant. For example, a user may wish to share opportunity details with another user of the same team or group in an effort to capitalize on the opportunity. By selecting sharing button 1210, other users of the same tenant may be able to access details of the user's shared opportunity. Campaign influence 1212 is a related list on the opportunity webpage 1200. Campaign influence 1212 may display a list of campaigns which have influenced an opportunity. Campaign influence 1212 may use and display information from refactored campaign_member table 1004. Campaign influence 1212 may contain campaign detail information for multiple campaigns and include information such as campaign name, contact name, the role of the campaign, indication whether the campaign is primary, and the date the campaign was first associated with an opportunity. Campaigns that are listed in campaign influence 1212 inform the user that the campaign has influenced the opportunity within which campaign influence 1212 is listed. Add campaign button 1214 may be used to add additional influencing campaigns to campaign influence 1212. Add campaign button 1214 may use campaign_influence_adj 1002 to provide the ability to manually add influenced campaigns to campaign influence 1212. For example, if a campaign is determined to be an influence upon a particular opportunity, the user may select add campaign button 1214 to manually add a campaign to the list of influencing campaigns. Campaign influence action buttons 1216 allows the user to edit and delete listed influencing campaigns. For example, by selecting a campaign influence action button 1216, the user can edit the details listed for an influencing campaign. Campaign influence campaign names 1218 is a listing of named campaigns that have had an influence on a particular opportunity. Campaign influence contact names 1220 is a listing of names for points of contact associated with an opportunity. For example, a tradeshow campaign may result in an interested company representative giving contact information for a future purchase negotiation. The interested company representative's name may then be stored in campaign influence contact names 1220 and in association with the tradeshow campaign. Campaign influence role 1222 allows the user to indicate the part that a contact plays in a specific opportunity. For example, a contact may have a role designated as negotiator, decision maker, evaluator, other, etc. Campaign influence primary campaign indicator 1224 may allow the user to indicate whether a listed campaign is a primary influencing campaign. An indicator mark in the primary campaign indicator column will signify that the campaign is the primary influencing campaign for the specific opportunity. An opportunity can only have one indicated primary influencing campaign. Campaign influence help 1226 may provide the user with instructions detailing use of the campaign influence feature. Campaign influence first associated date 1228, represents the first date that a campaign and an opportunity are first associated. For example, if a new potential business opportunity contact is made at a campaign tradeshow, the date of the tradeshow may be entered as the campaign first associated date 1228. Contact roles 1230 may display a list of contact role information. Contact roles 1230 may use and display information stored in opportunity_contact_role 608. For example, contact roles 1230 may display role designation information such as negotiator, decision maker evaluator, etc., as well as other contact information such as contact name, electronic mailing address, phone number, and account name.

Figure 13:
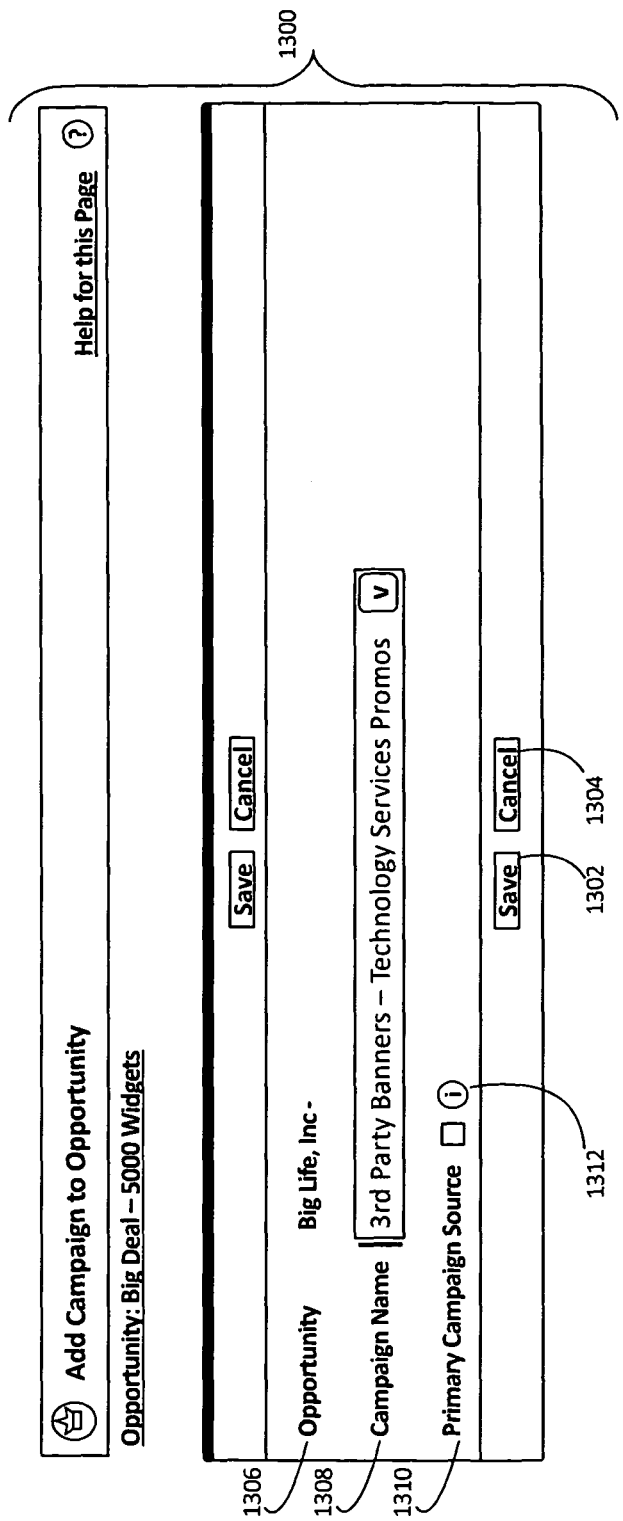
FIG. 13 is a screenshot of an embodiment of an expanded dialogue box for adding campaign influence to an opportunity.

FIG. 13 is a screenshot of an embodiment of an expanded dialogue box for adding campaign influence to an opportunity. Add campaign dialogue box 1300 may include save button 1302, cancel button 1304, opportunity name 1306, campaign drop-down menu 1308, primary campaign source selection 1310, and information icon 1312. In other embodiments, add campaign dialogue box 1300 may not have all of the elements listed and/or may have other elements instead of or in addition to those listed.

Save button 1302 may allow a user to save a campaign manually added to an opportunity's influencing campaign list. Cancel button 1304 may allow a user to quit add campaign dialogue box 1300 and return to opportunity 302 without adding an influencing campaign. Opportunity name 1306 lists the name of the opportunity from which the user accessed add campaign dialogue box 1300. Campaign drop-down menu 1308 may allow a user to specify the influencing campaign to add to the opportunity. Campaign drop-down menu 1308 may contain a list of previously saved campaigns that the user may designate as an influencing campaign by selecting the drop-down menu and highlighting the appropriate campaign. Primary campaign source selection 1310 may allow a user to mark an influencing campaign as a primary influencing campaign. For example, when an opportunity is a direct result of a particular campaign, the campaign may be identified as a primary influencing campaign and the user may use primary campaign source selection 1301 to indicate the campaign as primary. Information icon 1312 may provide the user answers to frequently asked questions and explanations of the various add campaign dialogue box 1300 features.

Add campaign dialogue box 1300 may allow a user to manually add influencing campaigns to an opportunity's influencing campaign list. For example, a user may determine from a customer that an opportunity was created because of an ad campaign that was not previously on the influencing campaign list of the opportunity. The user may then manually add the influencing campaign by first selecting the add campaign button 1218, and then providing the requested information of add campaign dialogue box 1300.

FIG. 14 is a screenshot of an embodiment of a campaign influence list. Campaign influence list 1400 may contain campaign influence action buttons 1216, campaign influence campaign names 1218, campaign influence contact names 1220, campaign influence role 1222, campaign influence primary campaign indicator 1224, and campaign influence help 1226, as described in the description of FIG. 11. Additionally, campaign influence list 1400 may also include campaign responded indicator 1402. In other embodiments, campaign influence list 1400 may not have all of the components listed and/or may have other elements instead of, or in addition to, those listed above.

Campaign responded indicator 1400 may allow a user to indicate whether a campaign influence contact name associated with an opportunity and influencing campaign has responded to a particular influencing campaign. For example, an individual may be associated with an opportunity and an influencing electronic mailing campaign. Having responded to the influencing electronic mailing campaign, the campaign responded indicator 1400 may be selected accordingly.

FIG. 15 is a screenshot of an embodiment of a report menu for generating a campaign with influenced opportunities report. In order to generate a campaign influence report, in an embodiment, the user may first select campaign reports from a drop-down menu as the report type. The user may then highlight and select campaigns with influenced opportunities to receive a generated report that indicates the opportunities influenced by a user selected campaign.

FIG. 16*a*, FIG. 16*b*, and FIG. 16*c* are screenshots of an embodiment of a criteria options list for generating campaign influence reports. The criteria listed in FIG. 16*a*, FIG. 16*b*, and FIG. 16*c* for generating campaign influence reports can be selected by the user in various combinations to generate a report that contains summarized information of interest to the user. For example, in generating a campaign influence report, the user may choose to customize the report to return the campaign name, the opportunities influenced, the probability of closing the opportunity, and the potential dollar amount of the opportunity. These selections are reflected in FIG. 16*a* and FIG. 16*b*.

FIG. 17 is a screenshot of an embodiment of a generated campaign influence report. Campaign influence report 1700 depicts a campaign report generated from the selected criteria described in FIG. 16*a* and FIG. 16*b*. The campaign name, the opportunities influenced, the probability of closing the opportunity, and the potential dollar amount of the opportunity are all reflected in campaign influence report 1700. In an embodiment, the generated campaign influence report may automatically sum the amounts of the influenced opportunities, as illustrated at the bottom of generated campaign influence report 1700.

FIG. 18 is a screenshot of an embodiment of a dialogue box for accessing editing of campaign influence filter criteria. FIG. 18 may contain filter edit button 1802. In an embodiment, the user may edit the filters used in determining which campaigns influenced an opportunity. For example, the user may be interested only in influencing campaigns from the two prior fiscal quarters or interested only in influencing campaigns that are of the type broadcast advertising. By selecting edit button 1802, the user may edit the campaign influence filters to include only influencing campaigns from the two prior fiscal quarters or to only include broadcast advertising campaigns.

FIG. 19 is a screenshot of an embodiment of a dialogue box for enabling automatic rule association and creating automatic association rules. The dialogue box of FIG. 19 is accessed by the user after selecting edit button 1802 in FIG. 18. The dialogue box of FIG. 19 allows the user to enable or disable automatic association of campaigns with opportunities. Enabling automatic association may result in associating campaigns to opportunities when campaigns are related to an opportunity contact prior to the opportunity close date. Disabling automatic association requires the user to designate which campaigns are influencing an opportunity via the related list on the opportunity webpage 1200. Additionally, the user may create additional automatic association rules. For example, the user may specify additional automatic association rules such as having a campaign influence timeframe that equals ninety days or one fiscal quarter.

Figure 20:
FIG. 20 is a screenshot of an embodiment of a dialogue box for rule sorting and adding additional filters.

FIG. 20 is a screenshot of an embodiment of a dialogue box for rule sorting, specifying campaign lifetime, and adding additional report filters. Dialogue box 2000 may include sort order 2002, campaign lifetime 2004, and additional filters 2006. In other embodiments, dialogue box 2000 may not have all of the elements listed and/or may have other elements instead of or in addition to those listed Sort order 2002 may allow a user to specify the order in which the automatic association rules are applied. Campaign lifetime 2004 may allow a user to specify the campaign lifetime by entering the number of days between the campaign first associated date and opportunity create date. Additional filters 2006 may allow the user to specify additional filters to further limit report criteria.

Method for Using the Environment (FIGS. 1 and 2)

Figure 21:
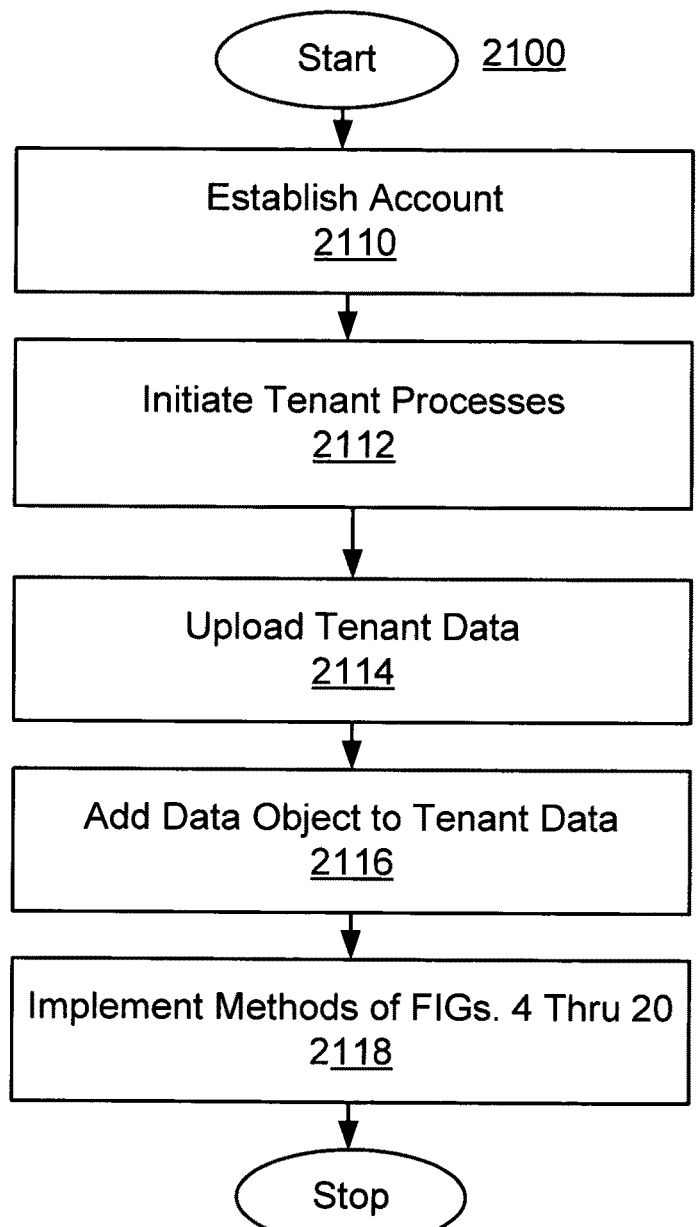
FIG. 21 shows a flowchart of an example of a method of using the environment of FIGS. 1 and 2.

FIG. 21 shows a flowchart of an example of a method 2100 of using environment 10 in FIG. 2. In step 2110, user system 12 (FIGS. 1 and 2) establishes an account. In step 2112, one more tenant process space 104 (FIG. 2) are initiated on behalf of user system 12, which may also involve setting aside space in tenant space 112 (FIG. 2) and tenant data 114 (FIG. 2) for user system 12. Step 2112 may also involve modifying application metadata to accommodate user system 12. In step 2114, user system 12 uploads data. In step 2116, one or more data objects are added to tenant data 114 where the data uploaded is stored. In step 2118, the methods associated with FIGS. 4-20 may be implemented. In another embodiment, although depicted as distinct steps in FIG. 21, steps 2110-2118 may not be distinct steps. In other embodiments, method 2100 may not have all of the above steps and/or may have other steps in addition to, or instead of, those listed above. The steps of method 2100 may be performed in another order. Subsets of the steps listed above as part of method 2100 may be used to form their own method.

Method for Creating the Environment (FIGS. 1 and 2)

Figure 22:
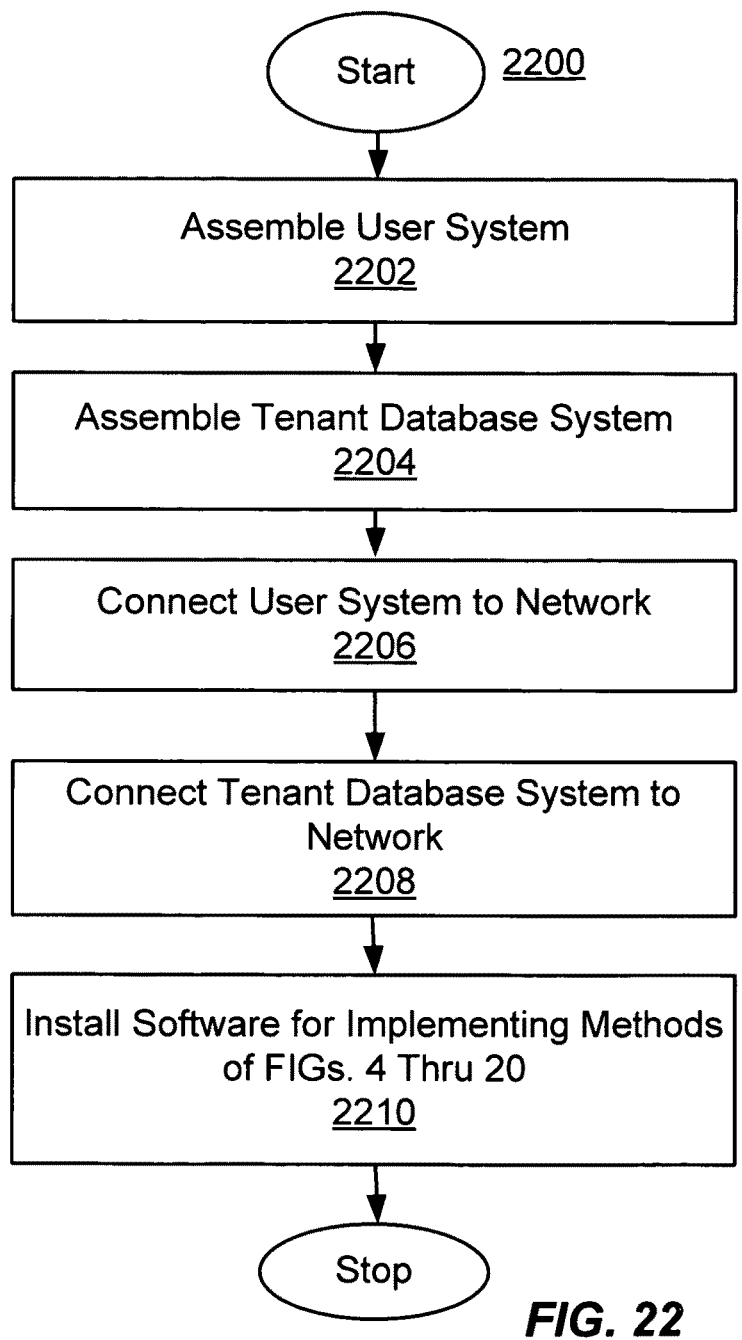
FIG. 22 shows a flowchart of an example of a method of making the environment of FIGS. 1 and 2.

FIG. 22 is a method of making environment 10, in step 2202, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 2204, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers $100_1$-$100_N$, system process space 102, tenant process spaces 104, tenant management process space 110, tenant space 112, tenant data 114, and application metadata 116 (FIG. 2).

In step 2206, user system 12 is communicatively coupled to network 104. In step 2208, system 16 is communicatively coupled to network 104 allowing user system 12 and system 16 to communicate with one another (FIG. 2). In step 2210, one or more instructions may be installed in system 16 (e.g., the instructions may be installed on one or more machine readable media, such as computer readable media, therein) and/or system 16 is otherwise configured for performing the steps of methods associated with FIGS. 4-20. In another embodiment, although depicted as distinct steps in FIG. 22, steps 2202-2210 may not be distinct steps. In other embodiments, method 2200 may not have all of the above steps and/or may have other steps in addition to, or instead of, those listed above. The steps of method 2200 may be performed in another order. Subsets of the steps listed above as part of method 2200 may be used to form their own method.

Extensions and Alternatives

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for apportioning opportunity among campaigns in an on-demand service in a machine resident host system for a multi-tenant database system, the method comprising:
   receiving at a machine resident host system, a request from a user machine for marketing information;
   automatically, by a processor system of the machine resident host system, determining which campaigns are related to an opportunity, based on information related to the campaigns and information about opportunities, the information related to the campaigns and the information about opportunities being stored in one or more one or more tables stored in a memory system of the machine resident host system; in response to the user request for marketing information, providing an automatic association of campaigns with an opportunity;
   and
   providing a filtered set of campaigns that are related to at least one opportunity in response to the request, based on the determining.

2. The method of claim 1, the method further comprising:
   sending a manual add campaign feature that allows a user to add additional campaigns to a list of campaigns that are related to the opportunity,
   receiving from a user machine, a request to add a campaign to the list, via the manual add campaign feature; and
   adding the campaign to the list.

3. The method of claim 1, the automatic determining of which campaigns are related to the opportunity includes at least automatically associating a campaign with the opportunity when the campaign is related to a contact that is associated with the opportunity.

4. The method of claim 1, the automatic determining of which campaigns are related to the opportunity includes at least
automatically associating campaigns with the opportunity based on information stored about the campaigns that is related to information stored about the opportunity, and determining campaigns that were manually added via a manual add campaign feature.

5. The method of claim 1, the request for marketing information includes a request for a campaign influence report, which shows which campaigns influenced the opportunity; the method further comprising: sending the report.

6. The method of claim 1, the providing including at least sending to the user an opportunity related list, which includes a list of campaigns that are related to the opportunity.

7. The method of claim 1, further comprising sending to the user a list of opportunities that are related to a particular campaign.

8. The method of claim 1, the providing of a set of filtered campaigns includes providing an indication that one campaign is a primary campaign for the opportunity.

9. The method of claim 1, the method further comprising:
in response to the user request for marketing information, providing a feature for specifying campaign influence report columns; and
receiving from the user machine, campaign influence report column adjustments.

10. The method of claim 1, the method further comprising:
in response to the user request for marketing information, providing a feature for enabling and disabling automatic association of campaigns with an opportunity.

11. A method for apportioning opportunity among campaigns in an on-demand service in a machine resident host system for a multi-tenant database system, the method comprising:
receiving at a machine resident host system, a request from a user machine for marketing information;
automatically determining which campaigns are related to an opportunity;
providing a filtered set of campaigns that are related to at least one o opportunity in response to the request;
in response to the user request for marketing information, providing a feature for specifying campaign influence report columns:
receiving from the user machine, campaign influence report column adjustments; and
in response to the user request for marketing information, providing a feature for creating, editing, and sorting filters for automatically associating campaigns with an opportunity.

12. The method of claim 1, the automatic determining of which campaigns influenced an opportunity includes at least aggregating information from at least
a table containing campaign information;
a table containing information about opportunities; and
a table containing information about contacts.

13. The method of claim 12, the aggregating includes performing a join between the table containing information about campaigns, the table containing information about opportunities, and the table containing information about contacts.

14. The method of claim 12, the aggregating resulting in a table having at least
a foreign key from the table containing information about campaigns,
a foreign key from the table containing information about opportunities, and
a foreign key from the table containing information about contacts.

15. The method of claim 1, further comprising forming a table containing information about members of a campaign by at least aggregating information from at least
a table containing information about contacts;
a table containing information about leads; and
a table containing information about campaigns.

16. The method of claim 1, further comprising gathering information about members of a campaign by at least aggregating information from at least
a table containing information about contacts;
a table containing information about leads; and
a table containing information about campaigns.

17. The method of claim 1, further comprising gathering information about roles of contacts for an opportunity by at least aggregating information from at least
a table containing information about contacts; and
a table containing information about opportunities.

18. A non-transitory machine-readable medium storing thereon one or more instructions, which when implemented cause a processor to implement a method for apportioning opportunity among campaigns in an on-demand service in a machine resident host system for a multi-tenant database system, the method comprising:
receiving at a machine resident host system, a request from a user machine for marketing information;
automatically, by a processor system of the machine resident host system, determining which campaigns are related to an opportunity, based on information related to the campaigns and information about opportunities, the information related to the campaigns and the information about opportunities being stored in one or more one or more tables stored in a memory system of the machine resident host; in response to the user request for marketing information, providing an automatic association of campaigns with an opportunity;
and
providing, by the machine resident host system, a filtered set of campaigns that are related to at least one opportunity in response to the request, based on the determining.

19. The non-transitory machine readable medium of claim 18, the method further comprising:
sending a manual add campaign feature that allows a user to add additional campaigns to a list of campaigns that are related to the opportunity,
receiving from a user machine, a request to add a campaign to the list, via the manual add campaign feature; and
adding the campaign to the list.

20. The non-transitory machine readable medium of claim 18, the automatic determining of which campaigns are related to the opportunity includes at least automatically associating a campaign with the opportunity when the campaign is related to a contact that is associated with the opportunity.

21. The non-transitory machine readable medium of claim 18, the automatic determining of which campaigns are related to the opportunity includes at least
automatically associating campaigns with the opportunity based on information stored about the campaigns that is related to information stored about the opportunity, and determining campaigns that were manually added via a manual add campaign feature.

22. The non-transitory machine-readable medium of claim 18, the request for marketing information includes a request for a campaign influence report, which shows which campaigns influenced the opportunity; the method further comprising: sending the report.

23. The non-transitory machine readable medium of claim 18, the providing including at least sending to the user an opportunity related list, which includes a list of campaigns that are related to the opportunity.

24. The non-transitory machine readable medium of claim 18, further comprising sending to the user a list of opportunities that are related to a particular campaign.

25. The non-transitory machine readable medium of claim 18, the providing of a set of filtered campaigns includes providing an indication that one campaign is a primary campaign for the opportunity.

26. The non-transitory machine readable medium of claim 18, the method further comprising:
in response to the user request for marketing information, providing a feature for specifying campaign influence report columns; and
receiving from the user machine, campaign influence report column adjustments.

27. The non-transitory machine readable medium of claim 18, the method further comprising:
in response to the user request for marketing information, providing a feature for enabling and disabling automatic association of campaigns with an opportunity.

28. The non-transitory machine readable medium of claim 18, the method further comprising:
in response to the user request for marketing information, providing a feature for creating, editing, and sorting filters for automatically associating campaigns with an opportunity.

29. The non-transitory machine readable medium of claim 18, the automatic determining of which campaigns influenced an opportunity includes at least aggregating information from at least
a table containing campaign information;
a table containing information about opportunities; and
a table containing information about contacts.

30. The non-transitory machine readable medium of claim 29, the aggregating includes performing a join between the table containing information about campaigns, the table containing information about opportunities, and the table containing information about contacts.

31. The non-transitory machine readable medium of claim 29, the aggregating resulting in a table having at least
a foreign key from the table containing information about campaigns,
a foreign key from the table containing information about opportunities, and
a foreign key from the table containing information about contacts.

32. The non-transitory machine readable medium of claim 18, further comprising forming a table containing information about members of a campaign by at least aggregating information from the one or more table, which include at least
a table containing information about contacts;
a table containing information about leads; and
a table containing information about campaigns.

33. The non-transitory machine readable medium of claim 18, further comprising gathering information about members of a campaign by at least aggregating information from the one or more tables, which include at least
a table containing information about contacts;
a table containing information about leads; and
a table containing information about campaigns.

34. The non-transitory machine readable medium of claim 18, further comprising gathering information about roles of contacts for an opportunity by at least aggregating information from the one or more tables, which include at least
a table containing information about contacts; and
a table containing information about opportunities.

35. A machine resident host system for providing apportioning opportunity among campaigns to a user of a tenant in a multi-tenant database system, the host system comprising:
a processor system,
a memory system including at least
volatile memory, and
non-volatile memory;
the non-volatile memory including at least one machine readable medium carrying one or more sequences of instructions which when implemented causes the processor system to implement a method comprising:
receiving at a machine resident host system, a request from a user machine for marketing information;
automatically, by a processor system of the machine resident host system, determining which campaigns are related to an opportunity, based on information related to the campaigns and information about opportunities, the information related to the campaigns and the information about opportunities being stored in one or more one or more tables stored in a memory system of the machine resident host system; in response to the user request for marketing information, providing an automatic association of campaigns with an opportunity;
and
providing, the machine resident host system, a filtered set of campaigns that are related to at least one opportunity in response to the request, based on the determining.

36. The database system of claim 35, the method further comprising:
sending a manual add campaign feature that allows a user to add additional campaigns to a list of campaigns that are related to the opportunity,
receiving from a user machine, a request to add a campaign to the list, via the manual add campaign feature; and
adding the campaign to the list.

37. The database system of claim 35, the automatic determining of which campaigns are related to the opportunity includes at least automatically associating a campaign with the opportunity when the campaign is related to a contact that is associated with the opportunity.

38. The database system of claim 35, the automatic determining of which campaigns are related to the opportunity includes at least
automatically associating campaigns with the opportunity based on information stored about the campaigns that is related to information stored about the opportunity, and
determining campaigns that were manually added via a manual add campaign feature.

39. The database system of claim 35, the request for marketing information includes a request for a campaign influence report, which shows which campaigns influenced the opportunity; the method further comprising: sending the report.

40. The database system of claim 35, the providing including at least sending to the user an opportunity related list, which includes a list of campaigns that are related to the opportunity.

41. The database system of claim 35, further comprising sending to the user a list of opportunities that are related to a particular campaign.

42. The database system of claim 35, the providing of a set of filtered campaigns includes providing an indication that one campaign is a primary campaign for the opportunity.

43. The database system of claim 35, the method further comprising:
   in response to the user request for marketing information, providing a feature for specifying campaign influence report columns; and
   receiving from the user machine, campaign influence report column adjustments.

44. The database system of claim 35, the method further comprising:
   in response to the user request for marketing information, providing a feature for enabling and disabling automatic association of campaigns with an opportunity.

45. The database system of claim 35, the method further comprising:
   in response to the user request for marketing information, providing a feature for creating, editing, and sorting filters for automatically associating campaigns with an opportunity.

46. The database system of claim 35, the automatic determining of which campaigns influenced an opportunity includes at least aggregating information from the one or more tables, which include at least
   a table containing campaign information;
   a table containing information about opportunities; and
   a table containing information about contacts.

47. The database system of claim 46, the aggregating includes performing a join between the table containing information about campaigns, the table containing information about opportunities, and the table containing information about contacts.

48. The database system of claim 46, the aggregating resulting in a table having at least
   a foreign key from the table containing information about campaigns,
   a foreign key from the table containing information about opportunities, and
   a foreign key from the table containing information about contacts.

49. The database system of claim 35, further comprising forming a table containing information about members of a campaign by at least aggregating information from the one or more tables, which include at least
   a table containing information about contacts;
   a table containing information about leads; and
   a table containing information about campaigns.

50. The database system of claim 35, further comprising gathering information about members of a campaign by at least aggregating information from the one or more tables, which include at least
   a table containing information about contacts;
   a table containing information about leads; and
   a table containing information about campaigns.

51. The database system of claim 35, further comprising gathering information about roles of contacts for an opportunity by at least aggregating information from the one or more tables, which include at least
   a table containing information about contacts; and
   a table containing information about opportunities.

* * * * *